(12) United States Patent
Yuichi et al.

(10) Patent No.: US 7,897,288 B2
(45) Date of Patent: Mar. 1, 2011

(54) SEALING MEMBER FOR FUEL CELL, FUEL CELL, AND METHOD OF MANUFACTURING THE FUEL CELL

(75) Inventors: Aihara Yuichi, Yokohama (JP); Katsunori Sakai, Yokohama (JP)

(73) Assignee: Samsung SDI, Co., Ltd., Gyeonggi-do (KR)

( * ) Notice: Subject to any disclaimer, the term of this patent is extended or adjusted under 35 U.S.C. 154(b) by 1121 days.

(21) Appl. No.: 11/607,886

(22) Filed: Dec. 4, 2006

(65) Prior Publication Data

US 2007/0134538 A1 Jun. 14, 2007

(30) Foreign Application Priority Data

Dec. 2, 2005 (JP) .................... 2005-348979

(51) Int. Cl.
*H01M 2/38* (2006.01)
*H01M 2/40* (2006.01)
*H01M 8/24* (2006.01)
*H01M 2/02* (2006.01)
*H01M 2/08* (2006.01)
*H01M 2/20* (2006.01)
*H01M 2/14* (2006.01)

(52) U.S. Cl. .......... 429/460; 429/463; 429/469; 429/508

(58) Field of Classification Search ............ 429/26, 429/30, 33, 34, 35, 36, 37, 38, 44, 460, 463, 429/469, 508

See application file for complete search history.

(56) References Cited

U.S. PATENT DOCUMENTS

| 4,157,273 | A  | * | 6/1979  | Brady .................. 156/315 |
| 4,895,776 | A  | * | 1/1990  | Virkar et al. .......... 429/102 |
| 6,316,139 | B1 | * | 11/2001 | Uchida et al. ........... 429/36 |
| 6,720,103 | B1 | * | 4/2004  | Nagai .................... 429/36 |
| 2001/0021470 | A1 | * | 9/2001 | May et al. ............... 429/44 |
| 2004/0258974 | A1 | * | 12/2004 | Tsuji et al. ............. 429/34 |
| 2005/0042489 | A1 |   | 2/2005  | Fukuta et al. ........... 429/30 |
| 2005/0095490 | A1 | * | 5/2005  | Mittelstadt et al. ...... 429/35 |

FOREIGN PATENT DOCUMENTS

| JP | 2004-51728  | 2/2004 |
| JP | 2005-108565 | 4/2005 |

* cited by examiner

*Primary Examiner* — Jennifer K Michener
*Assistant Examiner* — Eli S Mekhlin
(74) *Attorney, Agent, or Firm* — Lee & Morse P.C.

(57) ABSTRACT

A sealing member for a fuel cell includes a pair of belts that include non-gas transmitting layers formed of aromatic polyimide or aluminum and thermoplastic resin layers. The belts are disposed such that the thermoplastic resin layers of the belts face each other, and the thermoplastic resin layers in outer edge portions of the belts are thermally bonded to each other. In a fuel cell, an inner portion of the belts engage the electrolyte membrane.

7 Claims, 6 Drawing Sheets

SEALING MEMBER FOR FUEL CELL, FUEL CELL, AND METHOD OF MANUFACTURING THE FUEL CELL

CROSS-REFERENCE TO RELATED APPLICATIONS

This application claims the benefit of Japanese Patent Application No. 2005-348979, filed on Dec. 2, 2005, in the Japanese Intellectual Property Office, the disclosure of which is incorporated herein by reference.

BACKGROUND OF THE INVENTION

1. Field of the Invention

Aspects of the present invention relate to a sealing member for a fuel cell, a fuel cell using the sealing member, and a method of manufacturing the fuel cell.

2. Description of the Related Art

A fuel cell is a device that generates electrical energy through an oxidation-reduction reaction between an oxygen gas that is supplied to an oxygen electrode and a hydrogen gas that is supplied to a fuel electrode, producing water as a by-product. A fuel cell is formed of a plurality of unit cells that are connected to each other, wherein each of the unit cells includes an electrolyte membrane, an oxygen electrode, and a fuel electrode.

To increase the power generation efficiency of the fuel cell, the gas transmittance of sealing members respectively disposed on an electrolyte membrane and surrounding parts of the electrolyte membrane must be reduced so that the oxygen gas and the hydrogen gas cannot leak to opposite electrodes in the unit cell.

The unit cell is typically disposed between a pair of separator plates that prevent the unit cells from disconnecting from each other. In this case also, the leakage of the oxygen gas and the hydrogen gas to the other unit cells must also be prevented.

Therefore, in the related art, a technique that uses a fluoride rubber as a gasket of the separator plates has been proposed. For example, Japanese Patent Publication No. 2004-51728 discloses a fuel cell that has an increased lifetime by improving the material of the gasket.

Also, Japanese Patent Publication No. 2005-108565 discloses a seal structure of a fuel cell having a gasket with a modified cross-section shape. However, when the sealing structure of the fuel cell disclosed in Japanese Patent Publication No. 2005-108565 is applied to a fuel cell having a polymer electrolyte membrane, gas leakage of oxygen gas and hydrogen gas cannot be completely prevented. That is, if the polymer electrolyte membrane does not have certain strength when the electrolyte membrane is inserted between the pair of gaskets, there is a possibility of breaking the polymer electrolyte membrane.

The Japanese Patent Publication No. 2005-108565 discloses a method of reducing the gas leakage of oxygen gas and hydrogen gas by stacking a plurality of sealing members having a picture-frame shape around an electrolyte membrane. However, if the sealing members are not bonded as one unit, there is a possibility of gas leakage due to gaps between the sealing members and thus, overall safety is not ensured. If the sealing members are formed of a resin film, the sealing members have flexibility. In such a case, when the sealing members are tightened using a screw when a unit cell is manufactured, there may be distortions in the sealing members. Therefore, there is a high possibility in such a structure of leakage of oxygen and hydrogen gases.

SUMMARY OF THE INVENTION

Aspects of the present invention provide a sealing member that can prevent a gas leakage from unit cell and a gas leakage from the unit cell itself, a fuel cell having the sealing member, and a method of manufacturing the fuel cell.

According to an aspect of the present invention, there is provided a sealing member for a fuel cell comprising a pair of belts, wherein the belt comprises a non-gas transmitting layer formed of aromatic polyimide or aluminum and a first thermoplastic resin layer on the non-gas transmitting layer, and wherein the belts are disposed such that the thermoplastic resin layers of the belts face each other, and outer edge portions of the thermoplastic resin layers are thermally bonded to each other.

The sealing member may further comprise an second thermoplastic resin layer on an opposite surface of the non-gas transmitting layer to the first thermoplastic resin layer.

According to the above configuration, the belts that constitute the sealing member may include non-gas transmitting layers formed of aromatic polyimide or aluminum. Therefore, gas leakage transmitting through the belts can be blocked, and in particular, the gas leakage in a unit cell of a fuel cell can be prevented. Also, since outer edge portions of the belts are thermally bonded to each other, gas leakage through the belts can be prevented, and in particular, the gas leakage in a unit cell of a fuel cell can be prevented.

According to another aspect of the present invention, there is provided a fuel cell comprising an electrolyte membrane, a pair of electrodes that engage the electrolyte membrane therebetween, and a sealing member that surrounds an edge portion of the electrolyte membrane, wherein the sealing member comprises a pair of belts that engage the edge portion of the electrolyte membrane therebetween in a thickness direction of the belts, wherein each belt comprises a non-gas transmitting layer and a first thermoplastic resin layer stacked on the non-gas transmitting layer, wherein the belts are disposed such that the first thermoplastic resin layers of the belts face each other, and wherein the edge portion of the electrolyte membrane is located between inner edge portions of the pair of the belts, and wherein outer edge portions of the thermoplastic resin layers are thermally bonded to each other.

The fuel cell may further comprise a second thermoplastic resin layer on an opposite surface of the non-gas transmitting layer to the thermoplastic resin layer.

In a fuel cell according to an aspect of present invention, an outer edge portion of one of the pair of the belts may protrude further than an outer edge portion of the other of the pair of the belts.

In the fuel cell according to an aspect of the present invention, the fuel cell may further comprise separator plates having gas flow channels, wherein each separator plates is respectively disposed on one of the electrodes opposite to the electrolyte membrane; and wherein gaskets on outer edge surfaces of the separator plates face each other. The outer edge portions of the belts may extend between the gaskets.

In the fuel cell according to aspects of the present invention, the thermoplastic resin layer may be formed of a fluorine containing thermoplastic resin or a fluorine containing rubber.

According to the above configuration, the belts that constitute the sealing member include non-gas transmitting layers formed of aromatic polyimide or aluminum. Therefore, gas leakage from an electrode to the other electrode can be blocked by the belts, and in particular, the gas leakage in a unit cell of a fuel cell can be prevented. Also, since outer edge portions of the belts are thermally bonded to each other, gas leakage through or between the belts can be prevented, and in particular, the gas leakage in a unit cell of a fuel cell can be prevented.

Also, since the edge portion of the electrolyte membrane is inserted between the inner edge portions of the belts and the outer edge portions of the belts are thermally bonded to each other, the gas leakage transmitting through the electrolyte membrane can be completely blocked.

According to an aspect of the present invention, there is provided a method of manufacturing a fuel cell, which comprises positioning a pair of belts to overlap on respective sides of an edge portion of an electrolyte membrane, positioning a pair of electrodes on respective sides of the electrolyte membrane, and thermally bonding outer edge portions of the belts at an outer area of the edge portion of the electrolyte membrane to form a sealing member sealing the electrolyte membrane at the edge portion, wherein the each belt comprises a non-gas transmitting layer and a first thermoplastic resin layers stacked on the non-gas transmitting layers, and in the positioning of the belts, the belts are disposed such that inner edge portions of each of the thermoplastic resin layers of the belts are disposed to face and engage the electrolyte membrane, and wherein in the thermal bonding, the outer edge portions of the thermoplastic resin layers are thermally bonded to each other.

The method may further comprise installing a pair of separator plates having gaskets and gas flow channels onto respective surfaces of the electrodes opposite to the electrolyte membrane after the thermal bonding, and wherein the gaskets hold the outer edge portions of the belts therebetween.

According to the above configuration, since the outer edge portions of the belts are thermally bonded after the belts overlap the edge portion of the electrolyte membrane, a fuel cell in which the electrolyte membrane is held between the inner edge portions of the belts and wherein the outer edge portions of the belts are thermally bonded can be manufactured. Therefore, gas leakage from an electrode to the other electrode can be blocked by the belts, and gas leakage in a unit cell of a fuel cell can be prevented. Also, since the outer edge portions of the belts are thermally bonded to each other, gas leakage through the belts can be prevented, and gas leakage in a unit cell of a fuel cell can be prevented. Also, since the edge portion of the electrolyte membrane is held between the inner edge portions of the belts and since the outer edge portions of the belts are thermally bonded, gas leakage through the electrolyte membrane can be completely blocked.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
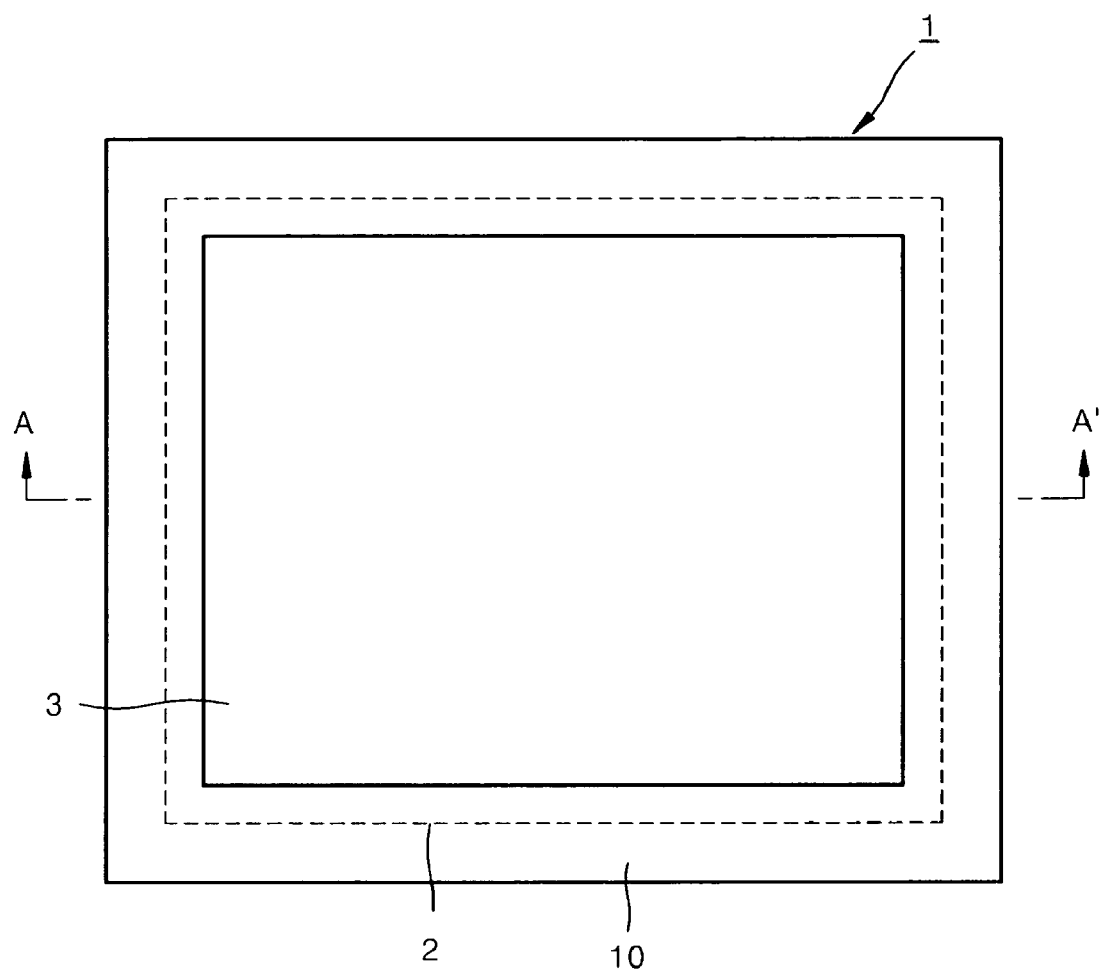
FIG. 1 illustrates a plan view of a fuel cell according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
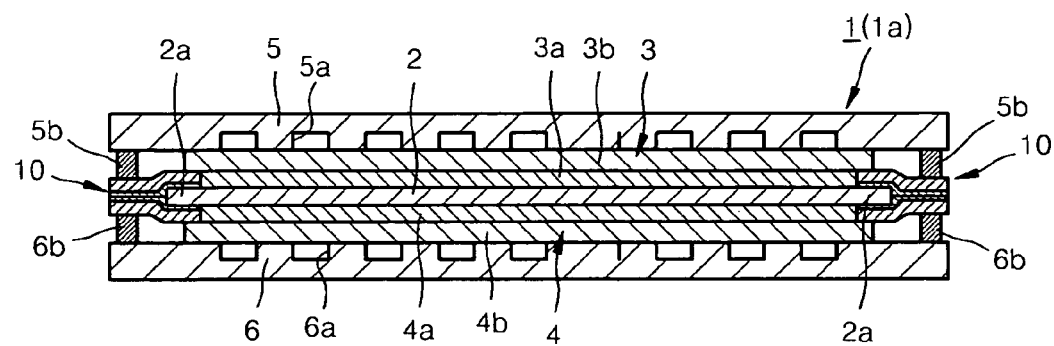
FIG. 2 illustrates a cross-sectional view taken along a line A-A' of the fuel cell of FIG. 1.
Figure 3:
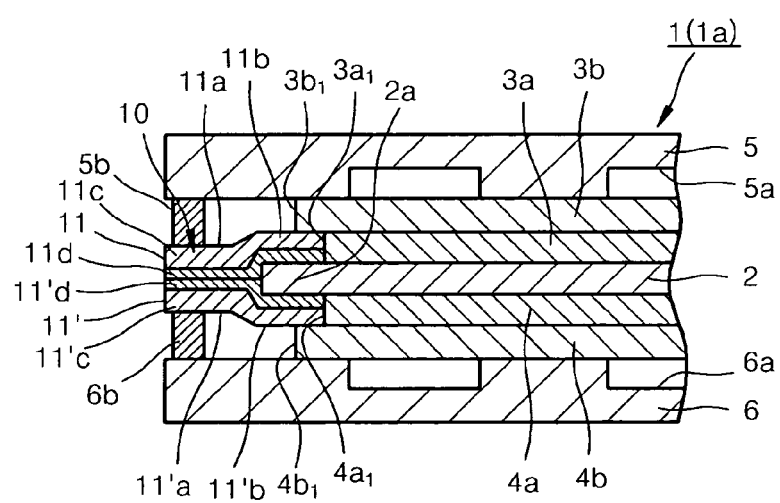
FIG. 3 illustrates an enlarged cross-sectional view of a main portion of the fuel cell of FIG. 1.

FIG. 1 illustrates a plan view of a fuel cell 1 according to an embodiment of the present invention. FIG. 2 illustrates a cross-sectional view taken along a line A-A' of the fuel cell 1 of FIG. 1, and FIG. 3 illustrates an enlarged cross-sectional view of a main portion of the fuel cell 1 of FIG. 1. The plan view of the fuel cell 1 of FIG. 1 does not include separator plates 5 and 6 on which gas flow channels 5a and 6a of FIG. 2 are formed.

The fuel cell 1 according to the embodiment of the present invention can be operated in an operation condition, such as, for example, an operating temperature of 80° C. to 300° C. and a relative humidity of 0 to 50%, and can include a single unit cell 1a as depicted in FIGS. 1 and 2 or a plurality of unit cells 1a connected in a series or parallel. For convenience of explanation, in the current embodiment, a fuel cell that has the single unit cell 1 depicted in FIG. 1 will be described.

Referring to FIGS. 1 and 2, the fuel cell 1 includes an electrolyte membrane 2, a pair of electrodes 3 and 4 such that the electrolyte membrane 2 is interposed between the pair of electrodes 3 and 4, separator plates 5 and 6 on which gas flow channels 5a and 6a are respectively formed on opposite sides to the electrolyte membrane 2, and a sealing member 10 surrounding an edge portion 2a of the electrolyte membrane 2. The fuel cell 1 is shown in FIG. 1 as being rectangular, but other shapes are possible, including square, circular, trapezoidal, etc. As used herein, the term "thickness" or "thickness direction" refers generally to a direction along a line that crosses by the shortest distance from the separator plate 5 to the electrode 3 to the electrolyte membrane 2 to the electrode 4 to the separator plate 6. The term "outer" refers generally to a direction or region along a line perpendicular to the thickness direction and towards the periphery of the fuel cell 1, whereas the term "inner" refers generally to a direction opposite to the outer direction. The term "width," when applied to the belts 11 and 11', refers to a dimension in the outer direction, that is, a distance from the innermost edge of the belt 11 or 11' to the outermost edge.

The electrolyte membrane 2 is a film formed of a proton conductive electrolyte having a thickness of 20 μm to 200 μm. The electrolyte membrane 2 transmits protons (hydrogen ions) generated in one electrode to another electrode. The proton conductive electrolyte that constitutes the electrolyte membrane 2 can be, for example, a perfluorocarbon sulfonic acid resin (operation temperature of approximately 80° C. to 100° C.), and a phosphoric acid electrolyte (operating temperature of approximately 100° C. to 300° C.) that is a material formed of polybenzimidazole or a derivative of polybenzimidazole impregnated with phosphoric acid.

The electrodes 3 and 4 respectively include catalyst layers 3a and 4a and gas diffusion layers 3b and 4b stacked on the catalyst layers 3a and 4a. As depicted in FIGS. 2 and 3, the gas diffusion layers 3b and 4b are formed to be larger than the catalyst layers 3a and 4a. That is, edge portions 3b1 and 4b1 of the gas diffusion layers 3b and 4b, respectively, protrude beyond the edge portions 3a1 and 4a1 of the catalyst layers 3a and 4a, respectively, in a direction perpendicular to the thickness direction of the electrodes 3 and 4. The catalyst layers 3a and 4a may have a thickness in a range from 1 μm to 300 μm, and, as a more specific example, may be in a range from 10 μm to 200 μm. The gas diffusion layers 3b and 4b may have a thickness in a range from 50 μm to 500 μm, and as a more specific example, may be in a range from 150 μm to 400 μm.

The gas diffusion layers 3b and 4b are formed of, for example, a conductive porous carbon sheet. The catalyst layers 3a and 4a include, for example, an electrode catalyst (catalyst), and a hydrophobic binding agent and a conductive material for consolidating the electrode catalyst. The electrode catalysts that constitute the catalyst layers 3a and 4a are not specifically limited but can be a metal that accelerates an oxidation reaction of hydrogen and a reduction reaction of oxygen, and can be, for example, Pb, Fe, Mn, Co, Cr, Ga, V, W, Ru, Ir, Pd, Pt, Rh, or an alloy of these metals. The electrode catalysts can be formed by soaking the metal or the alloy in an activated carbon.

The hydrophobic binding agent that constitutes the catalyst layers 3a and 4a can be, for example, a fluoride resin. For example, the fluoride resin may have a melting point of 400° C. or less. The hydrophobic binding agent can be a resin having a high hydrophobic and thermal resistance, such as, for example, polytetrafluoroethylene, a copolymer of tetrafluoroethylene-perfluoroalkylvinylether, polyvinylidene fluoride, a copolymer of tetrafluoroethylene-hexafluoroethylene, or perfluoroethylene. The hydrophobic binding agent prevents the catalyst layers 3a and 4a from becoming excessively wet by water produced during the power generation reaction, and prevents the obstruction of oxygen and hydrogen diffusion inside the electrodes 3 and 4.

The conductive material that constitutes the catalyst layers 3a and 4a can be any metal or carbon material that has electrical conductivity, such as, for example, a carbon black such as acetylene black, activated carbon, or graphite. The conductive material can be one of these materials or a composite of more than one of these materials.

The catalyst layers 3a and 4a may include a proton conductive electrolyte that constitutes an electrolyte membrane 2 instead of the hydrophobic binding agent or may include both the proton conductive electrolyte and the hydrophobic binding agent. The addition of the proton conductive electrolyte to the catalyst layers 3a and 4a can increase the proton conductivity in the catalyst layers 3a and 4a and can reduce the internal resistance of the catalyst layers 3a and 4a.

When a hydrogen gas is supplied to the electrode 3 and an oxygen gas is supplied to the electrode 4, the electrode 3 functions as a fuel electrode and the electrode 4 functions as an oxygen electrode. In the electrode 3, protons are produced due to the oxidation of hydrogen, and the protons reach the oxygen electrode 4 by being transmitted through the electrolyte membrane 2. In the oxygen electrode 4, an electrochemical reaction that produces water between the protons and oxygen is generated. As a result, electrical energy is generated.

The separator plates 5 and 6, on which gas flow channels 5a and 6a are respectively formed, are formed of a conductive metal, and are respectively connected to the electrodes 3 and 4. Gas flow channels 5a and 6a are respectively formed on surfaces of the separator plates 5 and 6 facing the electrodes 3 and 4. A hydrogen gas is supplied to the electrode 3 that functions as a fuel electrode through the gas flow channel 5a, and an oxygen gas is supplied to the electrode 4 that functions as an oxygen electrode through the gas flow channel 6a. The hydrogen gas may be in the form of a hydrocarbon or may be in the form of hydrogen produced by reforming of alcohol. The oxygen gas may be air.

Gaskets 5b and 6b formed of a fluorine rubber are respectively disposed on surfaces along or near the periphery of the separator plates 5 and 6. As will be described in greater detail, the gaskets 5b and 6b are connected to outer edge portions 11a and 11'a of belts 11 and 11' that constitute the sealing member 10, and the outer edge portions 11a and 11'a of the belts 11 and 11' contact the gaskets 5b and 6b. In other words, the gaskets 5b and 6b, together with the sealing member 10 span a gap between the separator plate 5 and the separator plate 6 along a periphery of the fuel cell such that the interior portion of the fuel cell is sealed off from the exterior.

As depicted in FIGS. 1 through 3, the sealing member 10 consists of a pair of belts or strips 11 and 11' that encircle the perimeter of the electrolyte membrane 2. Each of the belts 11 and 11' is formed by stacking a non-gas transmitting layer 11c or 11'c, which can be formed of an aromatic polyimide or aluminum, for example, and a first thermoplastic resin layer 11d or 11'd. The sealing member 10 has a structure in which the pair of belts 11 and 11' are disposed so that each of the first thermoplastic resin layers 11d and 11'd face each other. (In the embodiment depicted in FIGS. 1 through 3, although there are only first thermoplastic layers 11d and 11'd, these thermoplastic layers are referred to as "first" thermoplastic layers in order to distinguish the embodiment depicted in FIG. 5, for example, which has additional or second thermoplastic layers 21a and 21'a.) In order to provide a flat structure that encircles the perimeter of the electrolyte membrane 2, the belts 11 and 11' may be formed for example by providing sheets of a non-gas transmitting material and a thermoplastic resin material having a size greater than the size of the electrolyte membrane and cutting and removing a center portion of the sheets to create an opening that is smaller than the electrolyte membrane 2, so that what are left over are belts 11 and 11' that have a size and shape to encircle and overlap the electrolyte membrane 2.

As depicted in FIGS. 2 and 3, belts 11 and 11' each have an outer edge portion 11a and 11'a, and an inner edge portion 11b and 11'b. The edge portion 2a of the electrolyte membrane 2 is located between the inner edge portions 11b and 11'b and the electrolyte membrane 2 does not extend between the outer edge portions 11a and 11'a. As can be seen in FIGS. 2 and 3, the term "outer edge portion" refers to the region towards the periphery of the fuel cell along a line perpendicular to the thickness direction and the term "inner edge portion" refers generally to a region in an inner direction from the outer edge portion.

The inner edge portions 11b and 11'b of the belts 11 and 11' are fixed by being located between the edge portion 2a of the electrolyte membrane 2 and edge portions 3b1 and 4b1 of the gas diffusion layers 3b and 4b, such that the belts 11 and 11' also respectively contact the edge portions 3a1 and 4a1 of the catalyst layers 3a and 4a. The outer edge portions 11a and 11'a of the belts 11 and 11', on the other hand, do not contact the electrolyte membrane 2 or the gas diffusion layers 3b and 4b. The belts 11 and 11' may have a thickness equal to or slightly greater than the thickness of the catalyst layers 3a and 4a. For example, the thickness may be in a range from 6 µm to 330 µm, and as a more specific, non-limiting example, may be in a range from 13 µm to 220 µm. If the belts 11 and 11' have a thickness greater than the thickness of the catalyst layers 3a and 4a, the inner edge portion 11b and 11'b of the belts 11 and 11' can be firmly held in place by reason of being located between the edge portion 2a of the electrolyte membrane 2 and the edge portions 3b1 and 4b1 of the gas diffusion layers 3b and 4b.

While the inner edge portions 11b and 11'b of the belts 11 and 11' are located in contact with the edge portion 2a of the electrolyte membrane 2, the outer edge portions 11a and 11'a extend in an outer direction beyond the electrolyte membrane 2 so that there are no other structures between the outer edge portion 11a of one belt 11 and the outer edge portion 11'a of the other belt 11', and the first thermoplastic resin layers 11d and 11'd at the outer edge portions 11a and 11'a face each other. The outer edge portions 11a and 11a thermally bonded to each other, thereby forming the sealing member 10. In other words, as an example of forming of the sealing member 10, the belts 11 and 11' may be positioned on the electrolyte membrane 2 so that the inner edge portions 11b and 11'b rest on the electrolyte membrane 2 and the outer edge portions 11a and 11'a overhang off the edge of the electrolyte membrane 2 with the first thermoplastic resin layers 11d and 11'd facing each other. Then, the first thermoplastic layers 11d and 11'd at the overhanging outer edge portions 11a and 11'a are thermally bonded to each other, which seals off the edge 2a of the electrolyte membrane 2. In the assembled fuel cell, the gaskets 5b and 6b of the separator plates 5 and 6 respectively tightly contact the outer edge portions 11a and 11'a of the belts 11 and 11', thereby sealing the interior of the fuel cell 1.

In the present embodiment, the inner edge portions 11b and 11'b of the sealing member 10 according to the current embodiment contact the edge portion 2a of the electrolyte membrane 2. The outer edge portions 11a and 11'a of the sealing member 10 do not contact the edge portion 2a of the electrolyte membrane 2.

Each belt 11 and 11', as described above, is formed by stacking the non-gas transmitting layer 11c or 11'c formed of an aromatic polyimide or aluminum and the first thermoplastic resin layer 11d or 11d'. The non-gas transmitting layer 11c or 11'c may be formed of a material having very low gas transmittance, such as, for example, an aromatic polyimide or aluminum. These materials are easily deformed, maintain strength after deforming, and can endure a temperature of approximately 300° C. The non-gas transmitting layer 11c or 11'c may have a thickness in a range from 5 µm to 329 µm, and as a specific, non-limiting example, from 10 µm to 190 µm. If the non-gas transmitting layer 11c or 11'c has a thickness greater than 5 µm, the gas transmittance of the non-gas transmitting layer 11c or 11'c does not increase, and the possibility of gas leaking is reduced. If the non-gas transmitting layer 11c or 11'c has a thickness of 329 µm or less, the thickness of the unit cell 1a is enough to reduce the overall size of the unit cell 1a.

The first thermoplastic resin layers 11d and 11'd function as bonding layers when the belts 11 and 11' are thermally bonded to each other. The first thermoplastic resin layers 11d and 11'd may have thermal plasticity, thermal resistance, and corrosion resistance since the first thermoplastic resin layers 11d and 11'd directly contact the electrolyte membrane 2 in the inner edge portion 11b of the belt 11. The first thermoplastic resin layers 11d and 11'd may be formed of, for example, a fluorine containing thermoplastic resin, such as, for example, a polytetrafluoroethylene resin, or a copolymer of tetrafluoroethylene-hexafluoropropylene. The first thermoplastic resin layers 11d and 11'd may have a thickness in a range from 1 µm to 12 µm, and as a specific, non-limiting example, in a range from 3 µm to 10 µm. If the first thermoplastic resin layers 11d and 11d have a thickness greater than 1 µm, the belts 11 and 11' can be firmly thermally bonded to each other, and the possibility of gas leaking through the sealing member 10 is reduced. If the first thermoplastic resin layers 11d and 11'd have a thickness of 12 µm or less, the thickness of the unit cell 1a can be reduced.

Figure 4:
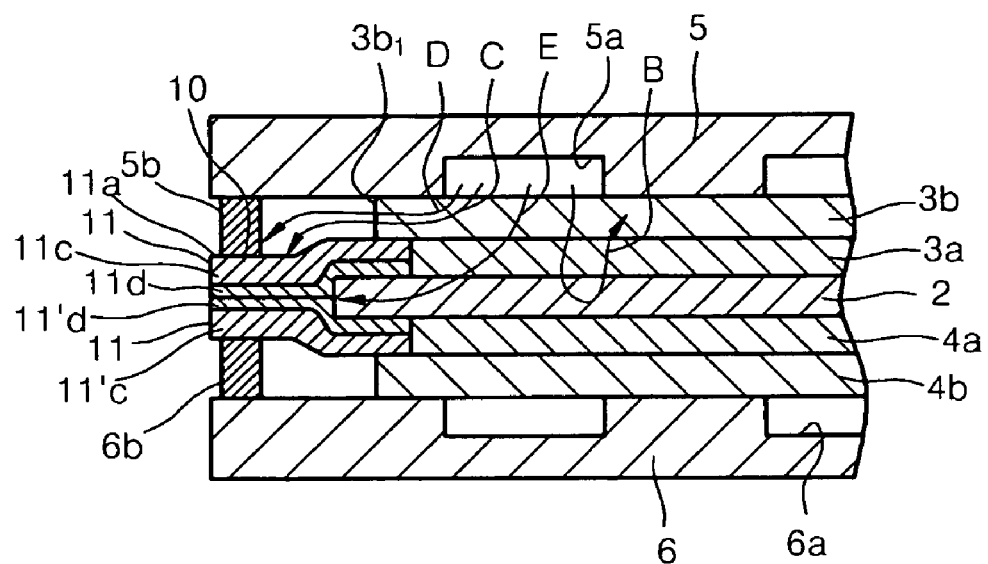
FIG. 4 is an enlarged cross-sectional view illustrating the flow of gas in the fuel cell of FIG. 1.

FIG. 4 is an enlarged cross-sectional view of a portion of the fuel cell of FIG. 1 showing the flow of gas in the fuel cell. The hydrogen gas supplied from the gas flow channel 5a of the separator plate 5 is supplied to the catalyst layer 3a by being uniformly distributed in the gas diffusion layer 3b as indicated by an arrow B. In the catalyst layer 3a, some of the hydrogen gas is transformed into protons through an oxidation reaction. The hydrogen gas is used for the oxidation reaction in the catalyst layer 3a after flowing through the catalyst layer 3a and the gas diffusion layer 3b.

At this point, some of the hydrogen gas supplied to the gas diffusion layer 3b diffuses from the edge portion 3b1 of the gas diffusion layer 3b towards the sealing member 10. There is a theoretical possibility that the diffused hydrogen gas could leak to the electrode 4 through the sealing member 10 as indicated by an arrow C. However, the hydrogen gas that diffuses from the edge portion 3b1 of the gas diffusion layer 3b is prevented from leaking to the electrode 4 through the sealing member 10 since the sealing member 10 includes non-gas transmitting layers 11c and 11'c.

Also, as indicated by an arrow D, there is a theoretical possibility that hydrogen gas that diffuses from the edge portion 3b1 of the gas diffusion layer 3b towards the sealing member 10 could leak to the outside of the fuel cell 1 (the unit cell 1a) through gaps between the gasket 5b and the sealing member 10. However, the hydrogen gas is prevented from leaking to the outside of the fuel cell 1 since the sealing member 10 provides a tight seal with the gaskets 5b and 6b in a thickness direction of the sealing member 10.

Also, as indicated by an arrow E, there is a theoretical possibility that the hydrogen gas could leak to the outside of the fuel cell 1 (the unit cell 1a) from the bonding portion of the belts 11 and 11' along bonding surfaces between the belts 11 and 11' and the electrolyte membrane 2. However, the hydrogen gas is prevented from leaking to the outside of the fuel cell 1 since the outer edge portions 11a and 11'a of the belts 11 and 11' are formed in one unit by thermal bonding.

Also, hydrogen gas is prevented from leaking to the electrode 4 by being transmitted through the electrolyte membrane 2, since the electrolyte membrane 2 is also made of a non-gas transmitting material.

Likewise, the leakage of oxygen gas along similar theoretical paths in the electrode 4 is prevented by the sealing member 10.

As described above, in the fuel cell 1 according to an embodiment of the present invention, since the belts 11 and 11' that constitute the sealing member 10 include the non-gas transmitting layers 11c and 11'c formed of aromatic polyimide or aluminum, the transmittance of hydrogen and oxygen gas, for example, from the one electrode 3 towards the other electrode 4 can be blocked, and gas leakage to the outside of the fuel cell 1 (unit cell 1a) can also be blocked. Also, since the outer edge portions 11a and 11'a of the belts 11 and 11' are thermally bonded to each other, gas transmittance between the belts 11 and 11' can be blocked, and gas leakage to the outside of the fuel cell 1 (unit cell 1a) can also be blocked.

Also, since the edge portion 2a of the electrolyte membrane 2 is blocked off by the inner edge portions 11b and 11'b of the belts 11 and 11' and the outer edge portions 11a and 11'a are thermally bonded to each other, gas leakage from the electrolyte membrane 2 can be completely blocked.

The outer edge portions 11a and 11'a of the belts 11 and 11' extend into a space between the gaskets 5b and 6b of the separator plates 5 and 6. Thus, the gas flow paths of the hydrogen gas and the oxygen gas defined by the electrolyte membrane 2, the separator plates 5 and 6, the gaskets 5b and 6b, and the sealing member 10 are completely sealed. Therefore, the gas leakage to the outside of the fuel cell 1 (unit cell 1a) can be completely blocked. In this way, the present embodiment further uses the gas leakage prevention function of the sealing member 10 itself and the gas leakage function of the gaskets 5b and 6b together with the sealing member 10, so that the gas leakage to the outside of the fuel cell 1 (unit cell 1a) can be completely blocked.

Figure 5:
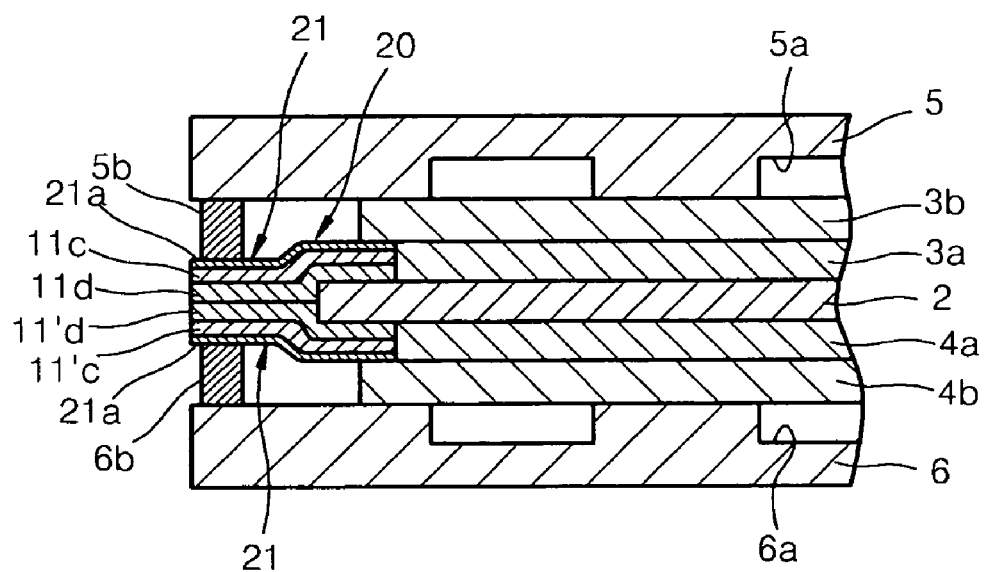
FIG. 5 illustrates an enlarged cross-sectional view of a fuel cell according to another embodiment of the present invention.

FIG. 5 illustrates an enlarged cross-sectional view of a fuel cell according to another embodiment of the present invention. In FIG. 5, like reference numerals are used to indicate elements that are substantially identical to the elements of FIGS. 1 through 4, and thus the detailed description thereof will be simplified or not be repeated.

The difference between a sealing member 20 of the fuel cell in FIG. 5 and the sealing member 10 of the fuel cell 1 in FIGS. 1 through 4 is that the sealing member 20 includes second thermoplastic resin layers 21a and 21'a on belts 21 and 21'.

That is, the belts 21 and 21' that constitute the sealing member 20 have a structure in which the second thermoplastic resin layers 21a and 21'a, non-gas transmitting layers 11c and 11'c formed of aromatic polyimide or aluminum, and thermoplastic resin layers first and 11'd are sequentially stacked. The pair of belts 21 and 21' are disposed such that the first thermoplastic resin layers 11d and 11'd face each other. The belts 21 and 21' have a thickness equal to the thickness of the belts 11 and 11' depicted in FIGS. 1 through 4.

The non-gas transmitting layers 11c and 11'c in the embodiment depicted in FIG. 5 may be formed of an aromatic polyimide or aluminum as are the non-gas transmitting layers 11c and 11'c in FIGS. 1 through 4, and may have a thickness in a range from 5 μm to 205 μm, or, as a specific, non-limiting example, in a range from 10 μm to 200 μm.

The first thermoplastic resin layers lid and 11'd in the embodiment depicted in FIG. 5 may be formed of polytetrafluoroethylene or a copolymer of tetrafluoroethylene-hexafluoropropylene like the first thermoplastic resin layers lid and 11'd in FIGS. 1 through 4, and may have a thickness in a range from 1 μm to 15 μm, or, as a specific, non-limiting example, in a range from 3 μm to 10 μm.

The second thermoplastic resin layers 21a and 21'a may be formed of a fluorine containing thermoplastic resin or a fluorine containing rubber. For example, the thermoplastic resin layers 21a and 21'a may be a polytetrafluoroethylene resin, a copolymer of tetrafluoroethylene-hexafluoropropylene, or a fluorine containing rubber. The second thermoplastic resin layers 21a and 21'a may have a thickness in a range from 1 μm to 15 μm, or, as a specific, non-limiting example, in a range from 3 μm to 10 μm. The tightness between the sealing member 20 and gaskets 5b and 6b is increased by forming the second thermoplastic resin layers 21a and 21'a to face the separator plates 5 and 6.

In this way, the gas leakage between the gaskets 5b and 6b and the sealing member 20 can be completely blocked.

Figure 6:
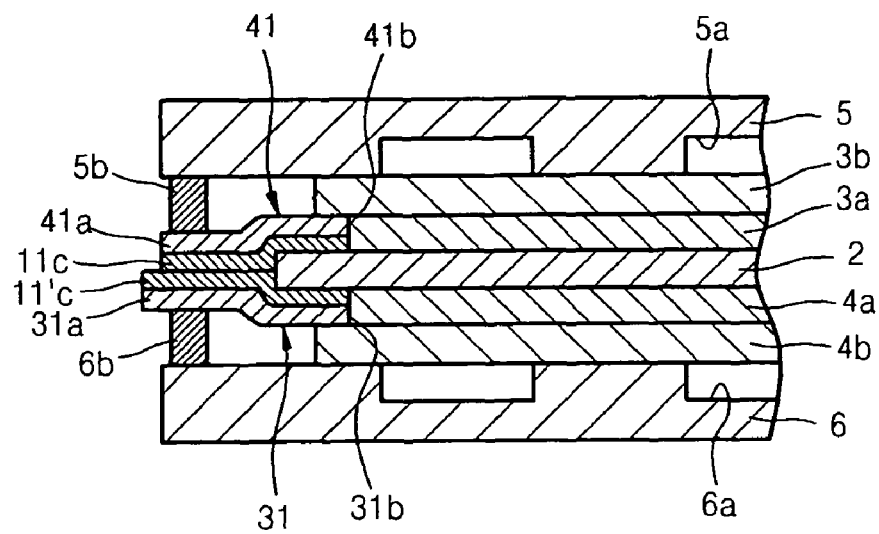
FIG. 6 illustrates an enlarged cross-sectional view of a fuel cell according to another embodiment of the present invention.

FIG. 6 illustrates an enlarged cross-sectional view of a fuel cell according to another embodiment of the present invention. In FIG. 6, like reference numerals are used to indicate elements that are substantially identical to the elements of FIGS. 1 through 4, and thus the detailed description thereof will be simplified or not be repeated.

The difference between a sealing member of a fuel cell in FIG. 6 and the sealing member 10 of the fuel cell 1 in FIGS. 1 through 4 is that an outer edge portion 31a of one belt 31 protrudes outwards farther than an outer edge portion 41a of the other belt 41. That is, a width of the belt 31 is greater than the width of the belt 41.

The structure of the sealing member depicted in FIG. 6 is effective when non-gas transmitting layers 11c and 11'c are formed of aluminum. When the non-gas transmitting layers 11c and 11'c are formed of aluminum, the non-gas transmitting layers 11c and 11'c respectively contact a pair of electrodes 3 and 4. Therefore, a voltage is generated between the non-gas transmitting layers 11c and 11'c. Also, there is a possibility of an electrical short between the outer edge portions 31a and 41a of the belt 31 and 41 that includes the non-gas transmitting layers 11c and 11'c since, as described above, the belts 31 and 41 are relatively members.

In this case, as depicted in FIG. 6, the outer edge portion 31a of the belt 31 can be formed to protrude farther outwards than the outer edge portion 41a of the belt 41. In this way, an electrical short between the outer edge portions 31a and 41a can be prevented by separating the outer edge portions 31a and 41a of the belts 31 and 41.

A method of manufacturing the fuel cell 1 depicted in FIGS. 1 through 3 will now be described with reference to FIGS. 7 through 10. The method of manufacturing the fuel cell according to an embodiment of the present invention includes a preparation process, a bonding process and an installation process of separator plates.

Figure 7:
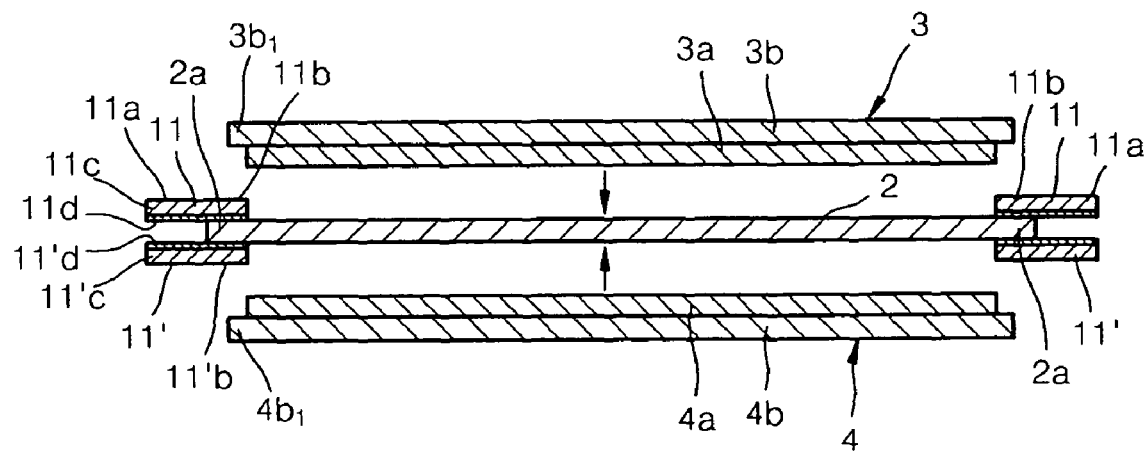
FIGS. 7-10 are cross-sectional views illustrating a method of manufacturing a fuel cell according to an embodiment of the present invention.

Referring to FIG. 7, in the preparation process, the electrolyte membrane 2 is prepared. The pair of belts 11 and 11' are positioned on the edge portion 2a of the electrolyte membrane 2. The belts 11 and 11' include the non-gas transmitting layers 11c and 11'c and the first thermoplastic resin layers 11d and 11'd. When the belts 11 and 11' are positioned on the edge portion 2a of the electrolyte membrane 2, the inner edge portions 11b and 11'b of the belts 11 and 11' overlap the edge portion 2a of the electrolyte membrane 2 and the outer edge portions 11a and 11'a protrude beyond the edge portion 2a. The belts 11 and 11' are oriented such that first thermoplastic resin layers 11d and 11'd at the inner edge portions 11b and 11'b face the electrolyte membrane 2 and the first thermoplastic layers 11d and 11d' at the outer edge portions 11a and 11'a face each other. Afterwards, the electrodes 3 and 4, which may include catalyst layers 3a and 4a, respectively, and diffusion layers 3b and 4b, respectively, are positioned on respective sides of the electrolyte membrane 2.

Figure 8:
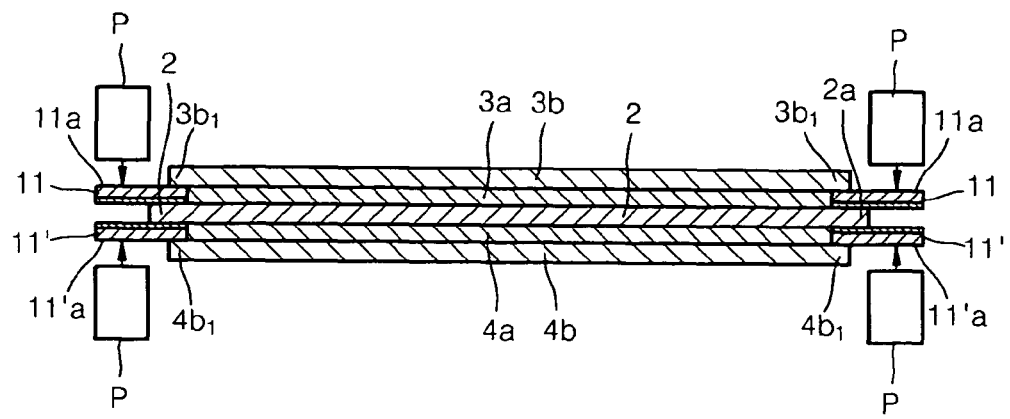

In the bonding process, the electrolyte membrane 2 is fixed between the electrodes 3 and 4. At this point, the belts 11 and 11' are fixed on account of the inner edge portions 11a and 11'a being located between the edge portion 2a of the electrolyte membrane 2 and the edge portions 3b1 and 4b1 of the gas diffusion layers 3b and 4b. The outer edge portions 11a and 11'a of the belts 11 and 11' that protrude outwards of the edge portion 2a of the electrolyte membrane 2 are thermally bonded to each other using a thermal press P as shown in FIG. 8.

Figure 9:
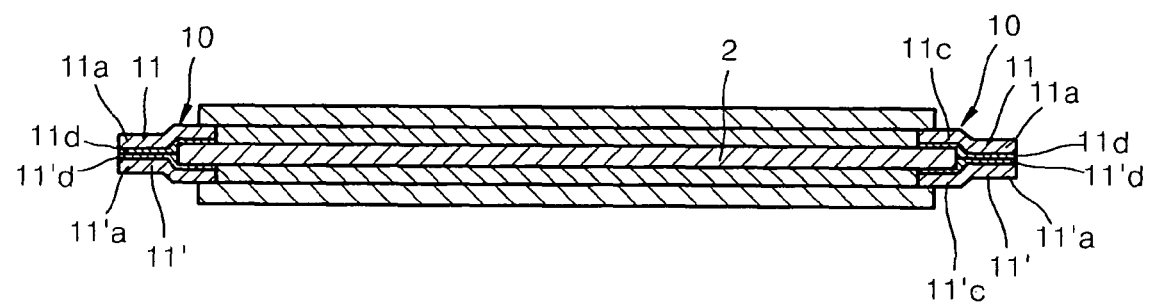

FIG. 9 illustrates the fuel cell 1 after the thermal pressing is performed. The first thermoplastic resin layers 11d and 11'd between the outer edge portions 11a and 11'a of the belts 11 and 11' are thermally bonded as one unit by the thermal press P. In this way, the sealing member 10 is formed.

Figure 10:
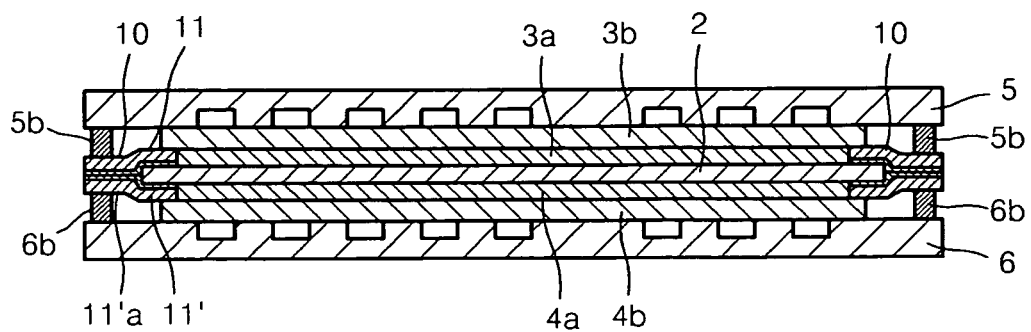

Referring to FIG. 10, in the installation process of the separator plates, the pair of separator plates 5 and 6 having gaskets 5b and 6b respectively thereon are disposed on the electrodes 3 and 4. The outer edge portions 11a and 11'a of the belts 11 and 11' engage the gaskets 5b and 6b.

In this way, the fuel cell 1 (unit cell 1a) depicted in FIGS. 1 through 3 is manufactured.

According to the above configuration, since the outer edge portions 11a and 11'a of the belts 11 and 11' are thermally bonded after the pair of belts 11 and 11' is positioned to overlap the edge portion 2a of the electrolyte membrane 2, the fuel cell 1 can be readily manufactured.

In the above manufacturing method, the electrodes 3 and 4 are positioned on the electrolyte membrane 2 in the preparation process, but the present invention is not limited thereto. That is, the electrodes 3 and 4 can be disposed on the electrolyte membrane 2 after the thermal bonding process is finished.

EMBODIMENTS

Embodiment 1

To evaluate the sealing member according to the present invention, a power generation unit cell was manufactured in the following procedure.

First, a polymer electrolyte membrane in a gel state was obtained by soaking a polybenzimidazole film in 85% phosphoric acid. The doping rate of the phosphoric acid was 450%, and the thickness of the polymer electrolyte membrane was 75 μm. The polymer electrolyte membrane was a square shape having dimensions of 5.4 cm×5.4 cm.

Electrodes (Vulcan XJ-72 containing 30% of a Pt catalyst formed on carbon paper to a density of 0.5 mg/cm$^2$) manufactured by E-TEK Co. were used as a fuel electrode and oxygen electrode. The fuel electrode and the oxygen electrode both have a square shape having dimensions of 5 cm×5 cm.

Square shaped (7 cm×7 cm) carbon separators having gas flow channels (grooves) were prepared as separators plates with gas flow channels. Also, current collectors and end plates were prepared. A groove was formed on an end portion of the carbon separator that faces the surface of the electrodes, and a fluorine rubber was inserted into the groove.

A p-substituted polyimide film having a thickness of 12 μm was prepared as a non-gas transmitting layer. A hydro-dispersion solution of a copolymer of tetrafluoroethylene-hexafluoropropylene (a fluorine containing resin) was coated on both surfaces of the non-gas transmitting layer using micro gravure printing, and moisture was removed by primary drying. Next, a thermoplastic resin layer formed of fluorine resin was formed on a surface of the non-gas transmitting layer by heating the fluorine resin to a temperature of 300° C. using a far-infrared ray heater. The thickness of each of the thermoplastic resin layers was 3 μm.

Next, in order to form a belt from a stack consisting of the non-gas transmitting layer and the thermoplastic resin layer, the stack was cut to a square shape having dimensions of 7 cm×7 cm. Afterwards, the stack was formed into a belt shape by punching a hole of 4.6 cm×4.6 cm using a puncher.

Based on the dimensions of the belt and the electrolyte membrane, the width of the inner edge portion, that is, the portion that overlaps the electrolyte membrane was 4 mm and the width of the outer edge portion of the belt was 8 mm, so that the sum width of the inner portion and the outer portion (the total width of the belt) was 12 mm. Also, based on the dimensions of the belt and the electrodes, the width of the edge portions of the electrodes that overlap the belt was 2 mm.

Afterwards, the pair of belts were positioned on opposite sides of the edge portion of the electrolyte membrane, the electrolyte membrane was inserted between the pair of the electrodes, and the outer edge portions of the pair of the belts were thermally bonded to each other using a thermal press. Afterwards, a carbon separator, a current collector, and an end plate were stacked on each of the electrodes, and were tightened for the resultant product using a compression force of 5 N, and thus, the manufacture of the unit cell of the fuel cell 1 according to an embodiment of the present invention was completed.

Embodiment 2

A unit cell of a fuel cell according to another embodiment of the present invention was manufactured as the same dimensions and materials as the embodiment 1 except that the thickness of each of the thermoplastic resin layers was 5 μm in the experimental embodiment 2.

Embodiment 3

A unit cell of a fuel cell according to another embodiment of the present invention was manufactured with the same dimensions and materials as the experimental embodiment 1 except that the thickness of each of the thermoplastic resin layers was 10 μm in the experimental embodiment 3.

Embodiment 4

A unit cell of a fuel cell according to experimental embodiment 4 was manufactured in the same method as the unit cell of the fuel cell of the experimental embodiment 1 except that the belt was manufactured by forming a thermoplastic resin layer formed of a copolymer of tetrafluoroethylene-hexafluoropropylene to a thickness of 5 μm on the surface of the non-gas transmitting layer, and the thermoplastic resin layers of the belts were disposed to face the electrolyte membrane.

Embodiment 5

A unit cell of a fuel cell according to experimental embodiment 5 is the same as the unit cell of a fuel cell of experimental embodiment 1 except that thermoplastic resin layers of experimental embodiment 5 were formed of a polytetrafluoroethylene resin and had a thickness of 3 μm.

Embodiment 6

A unit cell of a fuel cell according to experimental embodiment 6 was the same as the unit cell of a fuel cell of experimental embodiment 1 except that the non-gas transmitting layer of the experimental embodiment 6 was formed to a thickness of 15 μm using aluminum.

Comparative Example 1

An electrolyte membrane was formed in the same manner as the electrolyte membrane of experimental embodiment 1 except that the electrolyte membrane was formed to a square shape having dimensions of 7 cm×7 cm. In other words, the electrolyte membrane and the carbon separator had the same dimensions. The same electrodes, carbon separators, and end plates as the electrodes, carbon separators, and end plates of experimental embodiment 1 were prepared.

The electrolyte membrane was inserted between the pair of the electrodes, and the carbon separator, a current collector, and the end plate were overlapped onto the electrodes by using a tightening compression force of 5 N, and thus, the manufacture of a unit cell of a fuel cell according to a comparative example 1 was completed.

Comparative Example 2

A unit cell of a fuel cell according to comparative example 2 was manufactured in the same manner as the unit cell of a fuel cell of comparative example 1 except that the thermoplastic resin layers were formed to have a thickness of 15 μm.
(Evaluation)

Figure 11:
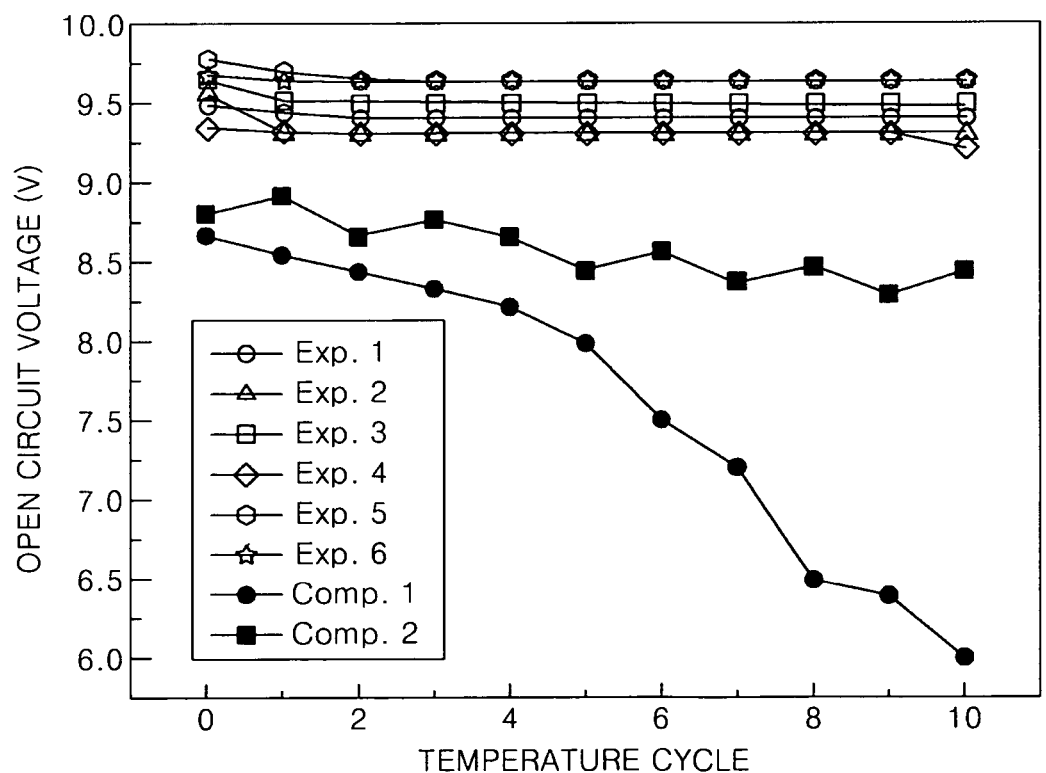
FIG. 11 is a graph of the relationship between temperature cycles and an open circuit voltage at 150° C. of experimental embodiments 1 through 6 and comparative examples 1 and 2 of a fuel cell, according to an embodiment of the present invention.

One temperature cycle involves supplying a hydrogen gas with a flowrate of 100 ml/min to the fuel electrode and air with a flowrate of 200 ml/min to the oxygen electrode, increasing the temperature of the unit cell to 150° C. and maintaining for 4 hours, reducing the temperature to 60° C. and maintaining for 4 hours, and then increasing the temperature to 150° C. again. Ten temperature cycles were applied to each of the fuel cells of the experimental embodiments 1 through 6 and comparative examples 1 and 2, and an open circuit voltage between the fuel electrode and the oxygen electrode at the temperature of 150° C. was measured in each cycle. FIG. 11 illustrates a graph of the relationship between temperature cycles and an open circuit voltage at 150° C. of experimental fuel cells of embodiments 1 through 6 and comparative examples 1 and 2.

Referring to FIG. 11, a variation in the open circuit voltages was not observed in the fuel cells of experimental embodiments 1 through 6. However, in the fuel cells of comparative examples 1 and 2, the open circuit voltage was reduced as the number of temperature cycle increased, and in particular, in the fuel cell of comparative example 1, the reduction in the open circuit voltage was significant. This is because the fuel cell of the comparative example 1 does not include a sealing member according to aspects of the present invention, and therefore gas leaked out in the unit cell of the fuel cell. In the fuel cell of the comparative example 2, a sealing member having a thickness relatively greater than the sealing member according to aspects of the present invention was used. Accordingly, the thermoplastic resin layer deformed during thermal pressing, and thus, there was gas leakage to the outside of the unit cell and thereby reducing the open circuit voltage.

As described above, aspects of the present invention provide a sealing member for a fuel cell that can prevent gas leakage wi a unit cell and gas leakage to the outside of the unit cell, a fuel cell having the sealing member, and a method of manufacturing the fuel cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A fuel cell comprising
an electrolyte membrane,
a pair of electrodes that engage the electrolyte membrane therebetween, and
a sealing member that surrounds an edge portion of the electrolyte membrane,
wherein the sealing member comprises a pair of belts that engage the edge portion of the electrolyte membrane therebetween in a thickness direction of the belts,
wherein each belt comprises a non-gas transmitting layer comprising aluminum and a first thermoplastic resin layer stacked on the non-gas transmitting layer,
wherein the belts are disposed such that the first thermoplastic resin layers of the belts face each other, and
wherein the edge portion of the electrolyte membrane is held between inner edge portions of the pair of the belts, wherein an outer edge portion of one belt of the pair of belts protrudes farther than an outer edge portion of the other belt of the pair of belts to provide an exposed peripheral portion that does not contact the other belt of the pair of belts and wherein outer edge portions of the first thermoplastic resin layers of the belts are thermally bonded to each other, except at the exposed peripheral portion.

2. The fuel cell of claim 1, wherein each belt has a second thermoplastic resin layer on an opposite surface of the non-gas transmitting layer to the first thermoplastic resin layer.

3. The fuel cell of claim 2, wherein the second thermoplastic resin layer is formed of a fluorine containing thermoplastic resin or a fluorine-containing rubber.

4. The fuel cell of claim 1, further comprising:
separator plates having gas flow channels, wherein each separator plate is respectively disposed on one of the electrodes opposite to the electrolyte membrane; and
gaskets on outer edge surfaces of the separator plates,
wherein the gaskets face each other; and
wherein the outer edge portions of the belts extend between the gaskets.

5. The fuel cell of claim 4, wherein each electrode comprises a catalyst layer that contacts the electrolyte membrane and a diffusion layer that contacts the catalyst layer and the respective separator plate,
wherein, with respect to each electrode, the electrolyte membrane and the diffusion layer extend farther in a length direction than the catalyst layer and
wherein, with respect to each electrode, an end portion of the belt contacts the catalyst layer, an inner edge portion of the first thermoplastic layer of the respective belt contacts the electrolyte membrane and a surface of the belt opposite to the first thermoplastic layer contacts the diffusion layer.

6. The fuel cell of claim 5, wherein each belt has a thickness that is equal to or greater than a thickness of the respective catalyst layer and wherein the inner edge portion of the belt is held in a fixed position by contact with the electrolyte membrane and diffusion layer.

7. The fuel cell of claim 1, wherein the first thermoplastic resin layer is formed of a fluorine containing thermoplastic resin.

* * * * *